US009344584B1

(12) United States Patent  (10) Patent No.: US 9,344,584 B1
Gluzman et al.  (45) Date of Patent: May 17, 2016

(54) SYSTEM, METHOD, AND COMPUTER PROGRAM FOR DYNAMICALLY APPLYING SESSION CONTROL TRIGGERS TO COMMUNICATION SESSIONS

(75) Inventors: Daniel Gluzman, Hertzeliya (IL); Zur Yahalom, Hod Hasharon (IL); Gal Eshet, Even Yehuda (IL); Omer Shani, Savvyon (IL)

(73) Assignee: Amdocs Software Systems Limited, Dublin (IE)

( * ) Notice: Subject to any disclaimer, the term of this patent is extended or adjusted under 35 U.S.C. 154(b) by 621 days.

(21) Appl. No.: 13/095,781

(22) Filed: Apr. 27, 2011

(51) Int. Cl.
*G06F 15/16* (2006.01)
*H04M 15/00* (2006.01)

(52) U.S. Cl.
CPC ........ *H04M 15/854* (2013.01); *H04M 15/8228* (2013.01)

(58) Field of Classification Search
CPC . H04M 15/8228; H04M 17/10; H04M 17/00; H04W 4/24
USPC .......................................................... 709/227
See application file for complete search history.

(56) References Cited

U.S. PATENT DOCUMENTS

| 5,963,625 | A | * | 10/1999 | Kawecki et al. | ......... | 379/127.01 |
|---|---|---|---|---|---|---|
| 7,609,682 | B2 | | 10/2009 | Ang et al. | | |
| 7,877,487 | B2 | * | 1/2011 | Cai et al. | ....................... | 709/227 |
| 2007/0242816 | A1 | | 10/2007 | Cai et al. | | |
| 2007/0263812 | A1 | * | 11/2007 | Polozola et al. | ......... | 379/144.02 |
| 2007/0280123 | A1 | * | 12/2007 | Atkins et al. | .................. | 370/252 |
| 2008/0027604 | A1 | * | 1/2008 | Oesterling | ....................... | 701/30 |
| 2011/0003579 | A1 | * | 1/2011 | Cai et al. | ....................... | 455/408 |
| 2012/0011261 | A1 | * | 1/2012 | Hirano et al. | ................. | 709/228 |

FOREIGN PATENT DOCUMENTS

WO   WO 2010/109860 A1 *  9/2010  .............. G06F 13/00

OTHER PUBLICATIONS

Intec, Intec launches Dynamic Charging Platform for wireless carriers, Jun. 23, 2003, retrieved from http://www.intecbilling.com/InteclaunchesDynamicChargingPlatformforwirelesscarriers.aspx on Apr. 27, 2011.

* cited by examiner

*Primary Examiner* — John MacIlwinen
(74) *Attorney, Agent, or Firm* — Zilka-Kotab, PC (57) ABSTRACT

A system, method, and computer program product are provided for dynamically applying session control triggers to communication sessions. In use, a request associated with a communication session for an entity is received. Additionally, at least one attribute associated with the entity is identified, in response to the request. Furthermore, it is determined whether at least one trigger implementing session control is to be set for the communication session, based on the at least one attribute. Moreover, the request is processed, based on the determination.

15 Claims, 5 Drawing Sheets

SYSTEM, METHOD, AND COMPUTER PROGRAM FOR DYNAMICALLY APPLYING SESSION CONTROL TRIGGERS TO COMMUNICATION SESSIONS

FIELD OF THE INVENTION

The present invention relates to communication sessions, and more particularly to applying session control to communication sessions.

BACKGROUND

Traditionally, communication sessions, including telephone calls, etc. have been processed and charged according to policies of communication providers. Oftentimes, these policies involve setting triggers for communication session control, where these triggers are processed at various points during a communication session flow to determine a course of action to take with respect to the communication session. Such actions may include allowing the communication session, terminating the communication session, etc.

Unfortunately, using the aforementioned triggers for providing control of communication sessions is associated with various drawbacks. For example, the triggers are generally applied without regard to a relevancy of the triggers to the particular communication session. Accordingly, processing of triggers that are not necessarily relevant (e.g. due to business needs, etc.) results in the unnecessary consumption of processing resources. There is thus a need for addressing these and/or other issues associated with the prior art.

SUMMARY

A system, method, and computer program product are provided for dynamically applying session control triggers to communication sessions. In use, a request associated with a communication session for an entity is received. Additionally, at least one attribute associated with the entity is identified, in response to the request. Furthermore, it is determined whether at least one trigger implementing session control is to be set for the communication session, based on the at least one attribute. Moreover, the request is processed, based on the determination.

DETAILED DESCRIPTION

Figure 1:
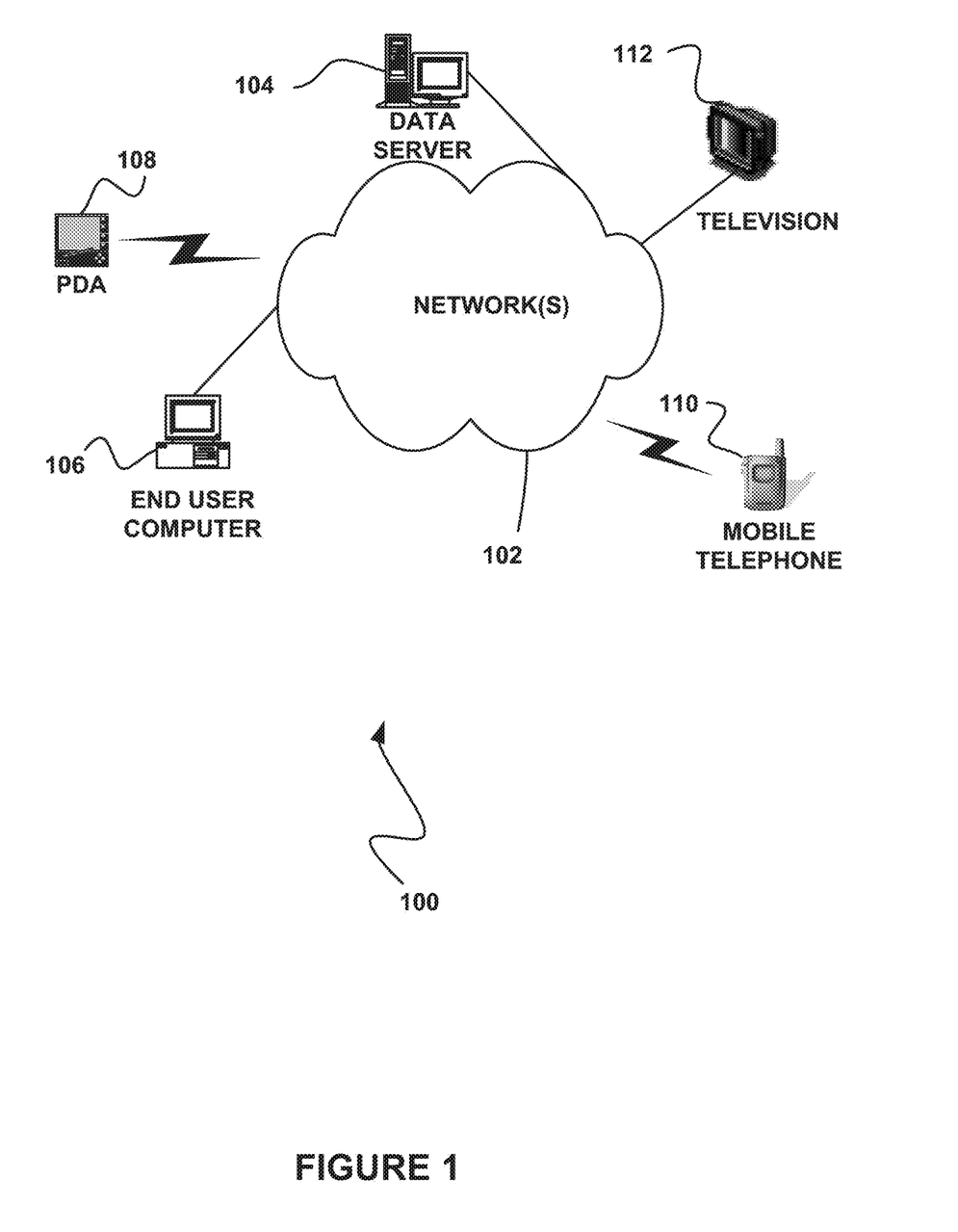
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
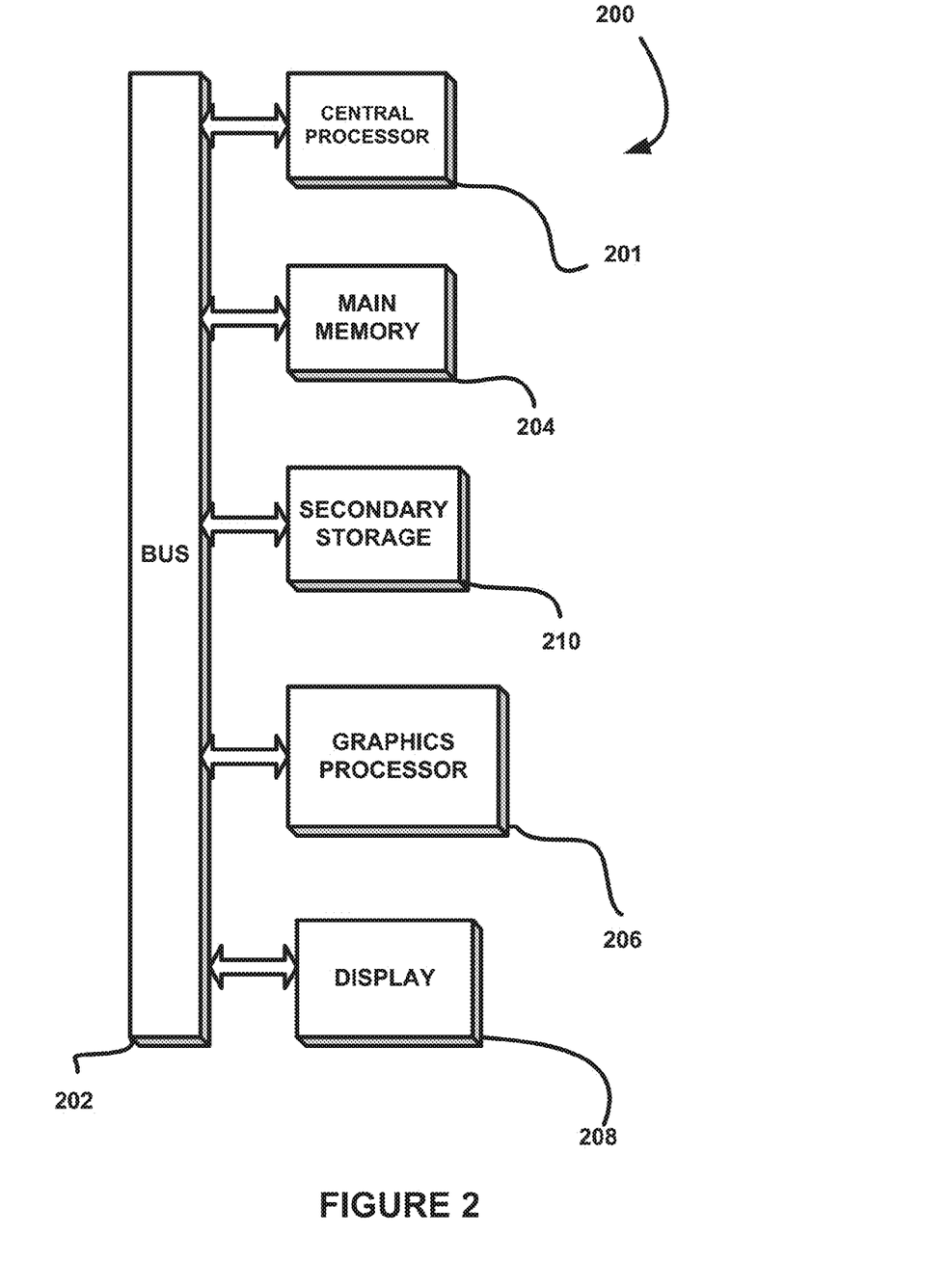
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
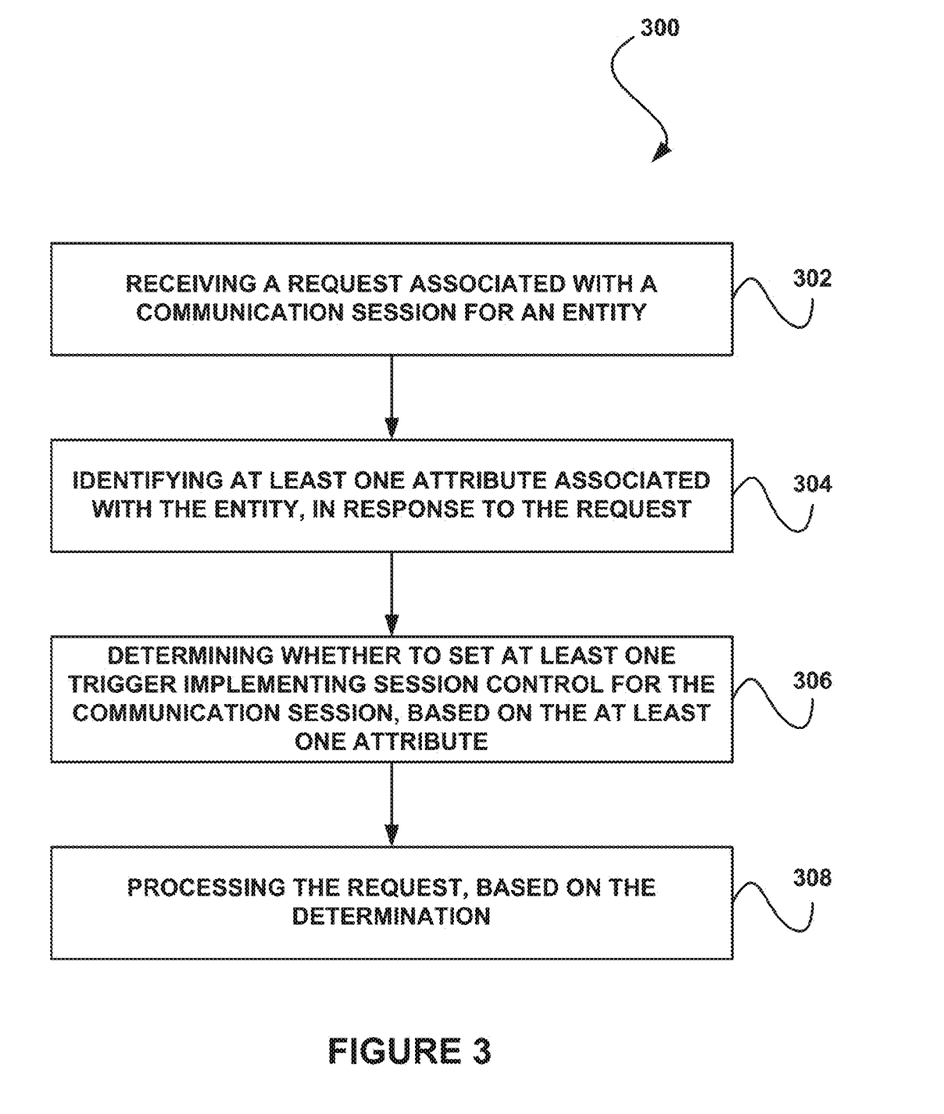
FIG. 3 illustrates a method for dynamically applying session control triggers to communication sessions, in accordance with one embodiment.

FIG. 3 illustrates a method 300 for dynamically applying session control triggers to communication sessions, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a request associated with a communication session for an entity is received. In the context of the present description, the communication session may include any session for the entity which allows the entity to communicate with at least one other entity. Thus, the communication session may include a session established over a network (e.g. the Internet, etc.).

Just by way of example, the communication session may include a telephone call, such as a network-based telephone call. In another example, the communication session may include a transmission control protocol (TCP) session, a hypertext transfer protocol (HTTP) session, a stream control transmission protocol (SCTP), a Diameter session, a RADIUS session, a CAMEL session, an IN PHII session, etc. In this way, the communication session may be used by the entity for communicating with another entity via a network.

It should be noted that the request associated with the communication session may include any request capable of affecting the communication session. In one embodiment, the request may be to establish the communication session. For example, the entity may be an entity initiating the communication session (i.e. an originating entity) via the request to establish the communication session.

In another embodiment, the request may be to accept the communication session. With respect to such embodiment, the entity may be an entity receiving the communication session (i.e. a terminating entity). Thus, for example, the entity may request to accept the communication.

In yet another embodiment, the request may be to terminate the communication session which has already been established. In such embodiment, the entity may be the originating or the terminating entity. In still yet another embodiment, the request may be to modify the communication session which has already been established. The modification may optionally include adding another entity to the communication session (e.g. via conference call), removing an entity from the communication session, etc.

As an option, the request may be received by a system utilized for processing such request. For example, the request may be received by a communications provider providing the communication session. As a further option, the entity may be a subscriber to the communications provider providing the communication session, where for example the entity subscribes to a prepaid service of the communications provider.

Additionally, as shown in operation 304, at least one attribute associated with the entity is identified, in response to the request. The attribute may include any characteristic or other descriptive value associated with the entity. Thus, the attribute may be collected from a profile of the entity, activities performed by the entity, an account (i.e. subscription) held by the entity (e.g. with the communications provider), etc.

In one embodiment, the attribute may include at least one static attribute. For example, the static attribute may include a type of the entity, such as whether the entity is an anonymous entity, a government entity, a corporate entity, etc., and/or any combination of the same (i.e. a hybrid entity). As another example, the static attribute may include an indication of availability of a registration of the entity (e.g. whether the entity has registered with the communications provider). With respect to such example, if the entity is of a non-anonymous type (i.e. is not an anonymous type), then the static attribute may indicate whether a customer registration certification is available for the entity. As yet another example, the static attribute may indicate whether the entity is a of a hybrid type and is subscriber to a prepaid policy of the communications provider.

In another embodiment, the attribute may include at least one dynamic attribute. For example, the dynamic attribute may include a current balance level of (e.g. an amount of money or other unit of measurement in) an account of the entity, such as an account held with the communications provider. As another example, the dynamic attribute may include aggregated balance levels for a plurality of accounts of the entity.

Such accounts may be for a single communications provider or multiple communications and/or other service providers. The aggregated balance levels may be across a predetermined period of time, as an option, such as current aggregated balance levels at the time of receipt of the request in operation 302.

As yet another example, the dynamic attribute may include a location of the entity (e.g. as determined using a global positioning system (GPS) of a device used by the entity to make the request). Such location may indicate whether the entity (i.e. the device used by the entity to make the request) is within a home network of the communications provider or is roaming with respect to the home network of the communications provider, for example.

As a further example, the dynamic attribute may include an indication of whether a prior balance of the account of the entity (e.g. with the communications provider) was completely depleted. Such indication may be with respect to a predetermined period of time, for example. In one embodiment, an indication that a prior balance of the account of the entity was depleted may further indicate that the entity was barred from making requests with respect to any communication session.

In another example, the dynamic attribute may include a risk level determined for the entity (or a group to which the entity belongs). Such risk level may be determined using a predetermined algorithm of the communications provider, for example. The risk level may optionally indicate a level of risk associated with the entity not paying a charge associated with a response to the request.

In the present embodiment, the dynamic attribute may be dynamic in that it may be updated at any point in time based on activity associated with the entity. For example, the dynamic attribute may be automatically updated in response to an activity of the entity. Such activity may include an activity of the entity which results in a reduction of a balance level of the account of the entity (e.g. another communication session request being processed for the entity, etc.), the entity moving locations, and/or any other activity of the entity capable of affecting a value of a dynamic attribute.

Furthermore, it is determined whether at least one trigger implementing session control is to be set for the communication session, based on the at least one attribute. Note operation 306. In the context of the present description, the trigger may include any interruption to the communication session for use in implementing session control with respect to the communication session. For example, the trigger may include an interruption at a predefined point in time during the communication session which automatically results in an analysis of data to make a decision regarding the communication session.

Thus, in one embodiment, the trigger may be utilized to analyze data in association with the communication session. Just by way of example, the trigger may check a prepaid balance of the entity. In particular, such trigger may be used to determine whether an account of the entity has a sufficient balance, such as a prepaid balance or other type of account balance, to cover a cost for processing a request associated with the communication session.

In another embodiment, the trigger may be utilized to make a decision regarding the communication. The decision may be made based on the data analysis described above. For example, the trigger may be utilized to determine an action to take in association with the communication session. It should be noted that the action may include simply continuing allowing the communication session, terminating the communication session, redirecting the communication session, issuing a notification in association with the communication session, disallowing a request associated with the communication session, allowing a request associated with the communication session, etc.

As an option, the trigger may include a conditional statement or other rule (e.g. associated with the data analysis) and associated actions to take based on an evaluation of the conditional statement/rule. For example, if the conditional statement/rule is met, the trigger may function to perform a first action and when not met may function to perform a second action. Of course, as another option, the trigger may function to perform various different actions depending on a result of an evaluation of the conditional statement/rule. In this way, the actions may be executed to provide session control for the communication session.

As noted above, the trigger may be associated with a predefined point in time during the communication session. Such predefined point in time may include a point in time in which the communication session is requested to be established, a point in time in which the communication session is requested to be modified (e.g. which may further include triggers for particular type of modification, a point in time in which the communication session is requested to be terminated, etc. As a further option, each trigger may be predefined for a particular points in time associated with the communication session.

As yet a further option, the trigger may include a trigger that is assigned to the entity. For example, the communications provider providing the communication session may assign the trigger to the entity. Of course, in another embodiment the trigger may include a general trigger that is not necessarily specifically assigned to the entity.

Still yet, the determination of whether to set the trigger for the communication session may be made in any manner that is based on the identified attribute(s). For example, the determination may be made based on an evaluation of at least one rule using the attribute. Optionally, the rule may be configured for (and/or by) the communications provider providing the communication session.

In one embodiment, the rule may include a condition capable of being evaluated using the attribute. In such embodiment, the trigger may be set for the communication session based on a result of the evaluation of the condition. Just by way of example, if the condition evaluates to true, the trigger may be set for the communication session, and if the condition evaluates to false, the trigger may not be set for the communication session, or vice versa.

It should be noted that the determination of whether to set the trigger(s) may be made on a trigger-by-trigger basis or on a collective basis for all triggers. For example, for each trigger, it may be determined whether such trigger is to be set for the communication session, based on the identified attribute(s). As another option, for all triggers it may be determined whether the triggers as a whole are to be set for the communication session, based on the identified attribute(s).

Moreover, as shown in operation 308, the request is processed, based on the determination. For example, a manner in which the request is processed may be based on the determination. In one embodiment, processing the request may include setting the trigger(s) for the communication session. In another embodiment, processing the request may include not setting the trigger(s) for the communication session.

For example, if it is determined in operation 306 that the trigger implementing session control is to be set for the communication session, then processing the request may include setting such trigger for the communication session. As another example, if it is determined in operation 306 that the trigger implementing session control is not to be set for the communication session, then processing the request may include not setting such trigger for the communication session.

Of course, it should be noted that other operations may be performed with respect to the processing of the request. For example, a response to the request may be provided. The response may include performing the action associated with the communication session which was requested via the request (e.g. establishing the communication session, etc.), or denying such action.

In an embodiment where the trigger is set, the other operations associated with the processing of the request may include processing a trigger associated with the request. In this way session control for the communication session may be provided utilizing the trigger. In an embodiment, where the trigger is not set, the other operations associated with the processing of the request may include implementing functions other than triggers for providing session control for the communication session. Such functions may be configured by the communications provider providing the communication session.

To this end, triggers implementing session control for a communication session may be dynamically set, based on attributes identified in association with an entity for which the communication session is established. This dynamic setting of session control triggers may allow triggers to be conditionally set based on a relevancy of such triggers to the communication session, as determined using rules, etc. which take into account the identified attributes. In this way, session control triggers, which generally delay communications or otherwise require additional processing with respect to a communication session, may optionally be prevented from being set for the communication session when the identified attributes indicate that the session control triggers are not necessary for providing session control for the communication session.

In one exemplary embodiment, the entity submitting the request associated with the communication session may be a prepaid subscriber who belongs to a specific customer type defined by the communications provider and who has a balance that is above a certain threshold predefined by the communications provider. In such example, where the communication is of a certain type predetermined by the communications provider (e.g. voice calls) that meets a certain criteria (e.g. not International) predefined by the communications provider, the trigger(s) may be prevented from being set and an account balance for the entity may be deducted "post event" as a result of the service (i.e. after the communications session is terminated or after the request is processed). As another example, where the communication session is of another type predetermined by the communications provider (e.g. data and other non-voice), the trigger(s) may be set in association with any request associated with the communication session.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
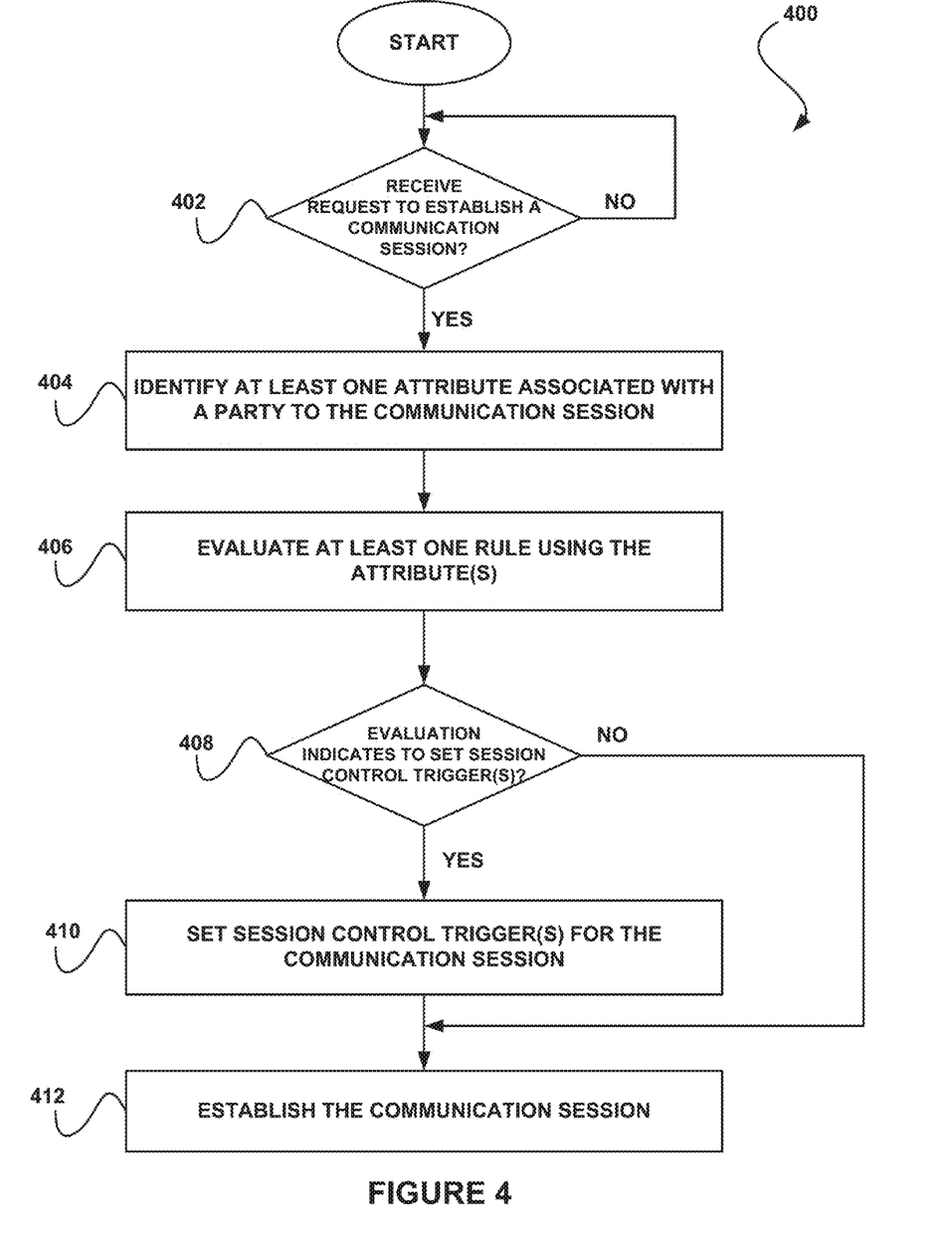
FIG. 4 illustrates a method for evaluating rules for conditionally setting session control triggers for a communication session, in accordance with another embodiment.

FIG. 4 illustrates a method 400 for evaluating rules for conditionally setting session control triggers for a communication session, in accordance with another embodiment. As an option, the method 400 may be carried out in the context of the details of FIGS. 1-3. Of course, however, the method 400 may be carried out in any desired environment. Again, the aforementioned definitions may equally apply to the description below.

As shown in decision 402, it is determined whether a request to establish a communication session is received. The request may be received from an entity requesting to communicate with another entity. In one embodiment, the request may be received by a communications provider capable of providing the communication session, for processing the request.

If it is determined that a request to establish a communication session is not received, the method 400 continues to wait for receipt of such a request. However, once it is determined that a request to establish a communication session is received, at least one attribute associated with a party to the communication session is identified. Note operation 404. In one embodiment, the party may include the entity which requested to establish the communication session (i.e. the originating party).

Optionally, the attribute may be identified from a database storing attributes for the entity. Such database may be maintained by the communications provider, for example. As another option, the attribute may be identified by analyzing real-time data, such as a location of the entity, etc.

Additionally, at least one rule is evaluated using the identified attribute(s), as shown in operation 406. The rule may be configured for the communications provider, in one embodiment. For example, the rule may reflect a policy of the communications provider. Thus, different communications providers may optionally be associated with different rules.

In the present embodiment, the evaluation of the rule may result in an indication of whether any session control triggers are to be set for the communication session. For example, each rule may be specific to a particular (e.g. different) session control trigger. Thus, an evaluation of the rule using at least one of the identified attributes (e.g. the attribute relevant to the rule) may indicate whether such session control trigger is to be set for the communication session.

To this end, it is determined whether the evaluation of the rule(s) indicates that at least one session control trigger is to be set for the communication session. If the evaluation indicates that at least one session control trigger is to be set for the communication session, then that session control trigger is set for the communication session. Note operation 410. The session control trigger may be set for the communication by inserting the session control trigger in a communication session flow of the communication session.

Furthermore, the communication session is then established, as shown in operation 412. Thus, the communication session may be established with the session control trigger(s) set for the communication session. As also shown, if the evaluation of the rule(s) indicates no session control triggers are to be set for the communication session, then the communication session is established (operation 412). In such embodiment, no session control triggers may be set for the communication session.

Figure 5:
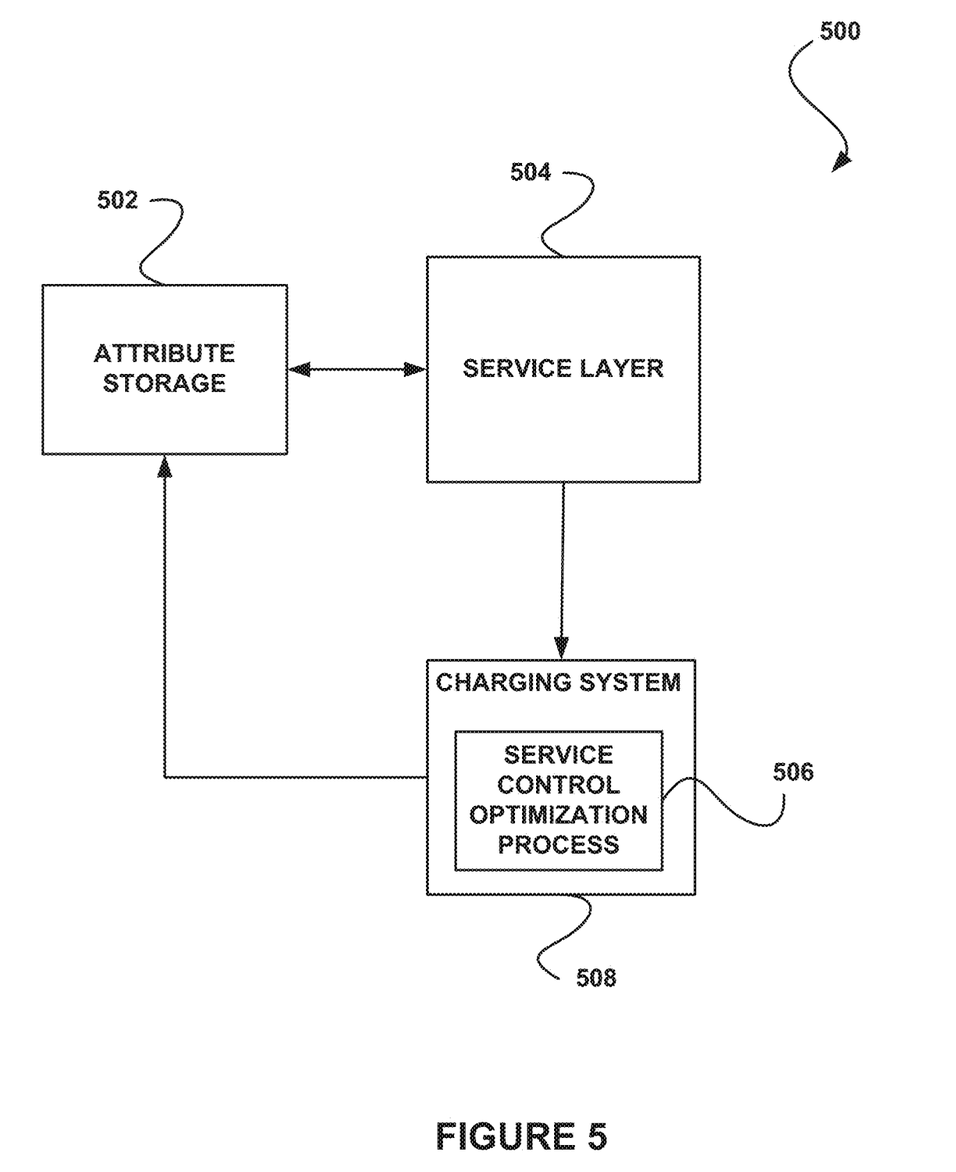
FIG. 5 illustrates a system for dynamically applying session control triggers to communication sessions, in accordance with yet another embodiment.

FIG. 5 illustrates a system 500 for dynamically applying session control triggers to communication sessions, in accordance with yet another embodiment. As an option, the system 500 may be implemented in the context of the details of FIGS. 1-4. For example, the system 500 may be implemented by the communications provider used for providing the communication session. Of course, however, the system 500 may be implemented in any desired environment. Again, the aforementioned definitions may equally apply to the description below.

As shown, a service layer 504 (i.e. application layer) is in communication with an attribute storage 502. The attribute storage 502 may store attributes associated with various entities. At least a portion of the attributes may be periodically updated, for example based on activities of the associated entity or reflect any other changes associated with the attributes stored for the entity.

Thus, the service layer 504 may query the attribute storage 502 for attributes of a specific entity. In one embodiment, the query may be responsive to receipt of a request by the service layer 504. In particular, the request may be received (directly or indirectly) from the entity for which the attributes are requested, and may include a request associated with a communication session for the entity.

In response to the query, the attribute storage 502 may return attributes associated with the entity to the service layer 504. The service layer 504 may then provide the attributes to a service control optimization process 506 for using the attributes to determine whether session control triggers are to be set for the communication session associated with the request. The service control optimization process 506 may include any executable algorithm for determining whether session control triggers are to be set for the communication session associated with the request.

It should be noted that while the service control optimization process 506 is shown as a component of a charging system 508 (i.e. used for charging for the communication session), the service control optimization process 506 may be located in other systems of the communications provider. For example, the service control optimization process 506 may be located in a pre-processing system which mediates between the charging system and external systems. To this end, the service control optimization process 506 may execute to determine whether session control triggers are to be set for the communication session associated with the request, based on the attributes received from the service layer 504.

The service control optimization process 506 (or another process of the communications provider) may then further process the request, according to the aforementioned determination. If the processing of the request results in any value of the attributes associated with the entity being changed, then the attribute storage is updated with the new value for the attribute(s), as shown. As a further option, the service control optimization process 506 may instruct provisioning systems (not shown) to move the entity from prepaid to postpaid and vice versa.

As noted above, the charging system 508 may charge for the communication session. In an embodiment where session control triggers are not set for the communication session, the charging system 508 may batch process charges for the communication session (and optionally other communication sessions), even where such charges include prepaid charges. In an embodiment where session control triggers are set for the communication session, the charging system 508 may process charges for the communication session in an event and message based manner (responsive to authorization and charges requests, for example, associated with the session control triggers).

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising computer code for:
   receiving a request to establish a communication session for an entity, where the communication session is used by the entity for communicating with another entity via a network;
   identifying a plurality of attributes associated with the entity, in response to the request to establish the communication session, the plurality of attributes including:
      an indication as to whether the entity is one or more of an anonymous entity, a government entity, and a corporate entity,
      an indication as to whether the entity has registered with a communications provider, an indication as to whether a customer registration certification is available for the entity, aggregated balance levels of a plurality of accounts of the entity, where the accounts are associated with a plurality of communications and service providers, a current physical location of the entity, an indication as to whether a prior balance of one of the plurality of accounts of the entity was completely depleted, and a time period associated with such depletion, and a risk level determined for a group to which the entity belongs;

establishing the requested communication session; and evaluating each of the plurality of attributes utilizing a plurality of rules;

conditionally setting a plurality of triggers implementing session control for the requested communication session, based on the evaluation, wherein each of the plurality of triggers interrupt the communication session at a predetermined point in time and determine a corresponding action based on a data analysis associated with the requested communication session, and the plurality of triggers include:

a first trigger that determines whether an account of the entity has a sufficient balance to cover a cost for processing a subsequent request associated with the requested communication session, and terminates the communication session when it is determined that the balance is insufficient.

2. The computer program of claim 1, wherein the communication session includes a telephone call.

3. The computer program of claim 1, wherein the computer program is operable such that the at least one attribute is automatically updated in response to an activity of the entity.

4. The computer program of claim 1, wherein the entity includes an entity initiating the communication session.

5. The computer program of claim 1, wherein the entity includes an entity receiving the communication session, where the communication session is initiated by another entity.

6. The computer program of claim 1, wherein the entity is a subscriber to a communications provider providing the communication session.

7. The computer program of claim 6, wherein the entity subscribes to a prepaid service of the communications provider via which the communications session is provided.

8. The computer program of claim 1, wherein the computer program is operable such that at least one of the triggers checks a prepaid balance of the entity.

9. The computer program of claim 1, wherein the corresponding actions include at least one of allowing the communication session, terminating the communication session, redirecting the communication session, and issuing a notification in association with the communication session.

10. The computer program of claim 1, wherein the computer program is operable such that the determination is made based on an evaluation of at least one rule using the at least one attribute.

11. The computer program of claim 10, wherein the computer program is operable such that the at least one rule is configured for a communications provider providing the communication session.

12. The computer program of claim 1, wherein the risk level determined for the group indicates a level of risk associated with the members of the group not paying a charge associated with a response to the request to establish the communication session.

13. A method, comprising:

receiving a request to establish a communication session for an entity, where the communication session is used by the entity for communicating with another entity via a network;

identifying a plurality of attributes associated with the entity, in response to the request to establish the communication session, the plurality of attributes including:

an indication as to whether the entity is one or more of an anonymous entity, a government entity, and a corporate entity, an indication as to whether the entity has registered with a communications provider, an indication as to whether a customer registration certification is available for the entity, aggregated balance levels of a plurality of accounts of the entity, where the accounts are associated with a plurality of communications and service providers, a current physical location of the entity, an indication as to whether a prior balance of one of the plurality of accounts of the entity was completely depleted, and a time period associated with such depletion, and a risk level determined for a group to which the entity belongs;

establishing the requested communication session; and evaluating each of the plurality of attributes utilizing a plurality of rules:

conditionally setting a plurality of triggers implementing session control for the requested communication session, based on the evaluation, wherein each of the plurality of triggers interrupt the communication session at a predetermined point in time and determine a corresponding action based on a data analysis associated with the requested communication session, and the plurality of triggers include:

a first trigger that determines whether an account of the entity has a sufficient balance to cover a cost for processing a subsequent request associated with the requested communication session, and terminates the communication session when it is determined that the balance is insufficient.

14. A system, comprising:

a computer processor for:

receiving a request to establish a communication session for an entity, where the communication session is used by the entity for communicating with another entity via a network;

identifying a plurality of attributes associated with the entity, in response to the request to establish the communication session, the plurality of attributes including:

an indication as to whether the entity is one or more of an anonymous entity, a government entity, and a corporate entity, an indication as to whether the entity has registered with a communications provider, an indication as to whether a customer registration certification is available for the entity, aggregated balance levels of a plurality of accounts of the entity, where the accounts are associated with a plurality of communications and service providers, a current physical location of the entity, an indication as to whether a prior balance of one of the plurality of accounts of the entity was completely depleted, and a time period associated with such depletion, and a risk level determined for a group to which the entity belongs;

establishing the requested communication session; and
evaluating each of the plurality of attributes utilizing a plurality of rules;
conditionally setting a plurality of triggers implementing session control for the requested communication session, based on the evaluation, wherein each of the plurality of triggers interrupt the communication session at a predetermined point in time and determine a corresponding action based on a data analysis associated with the requested communication session, and the plurality of triggers include:
a first trigger that determines whether an account of the entity has a sufficient balance to cover a cost for processing a subsequent request associated with the requested communication session, and terminates the communication session when it is determined that the balance is insufficient.

15. The system of claim 14, wherein the processor is coupled to memory via a bus.

* * * * *